US011809354B2

(12) United States Patent
Nahvi

(10) Patent No.: US 11,809,354 B2
(45) Date of Patent: Nov. 7, 2023

(54) BUFFER MANAGEMENT FOR ISO IN ENDPOINTS IN USB EXTENSION SYSTEMS

(71) Applicant: Icron Technologies Corporation, Burnaby (CA)

(72) Inventor: Mohsen Nahvi, North Vancouver (CA)

(73) Assignee: Icron Technologies Corporation, Burnaby (CA)

( * ) Notice: Subject to any disclaimer, the term of this patent is extended or adjusted under 35 U.S.C. 154(b) by 0 days.

(21) Appl. No.: 17/704,560

(22) Filed: Mar. 25, 2022

(65) Prior Publication Data

US 2022/0309016 A1 Sep. 29, 2022

Related U.S. Application Data

(60) Provisional application No. 63/167,532, filed on Mar. 29, 2021.

(51) Int. Cl.
*G06F 13/38* (2006.01)
*G06F 13/40* (2006.01)
*G06F 13/42* (2006.01)

(52) U.S. Cl.
CPC ........ *G06F 13/382* (2013.01); *G06F 13/4059* (2013.01); *G06F 13/4282* (2013.01)

(58) Field of Classification Search
CPC . G06F 13/382; G06F 13/4059; G06F 13/4282
See application file for complete search history.

(56) References Cited

U.S. PATENT DOCUMENTS

| 2006/0123129 | A1* | 6/2006 | Toebes | H04L 67/56 |
| | | | | 709/230 |
| 2014/0013013 | A1* | 1/2014 | Herrity | G06F 11/3051 |
| | | | | 710/18 |
| 2015/0254193 | A1* | 9/2015 | Priest | G06F 13/385 |
| | | | | 710/5 |
| 2016/0320823 | A1* | 11/2016 | Gerber | G06F 13/385 |
| 2017/0192922 | A1* | 7/2017 | Li | G06F 13/385 |
| 2019/0102333 | A1* | 4/2019 | Hundal | G06F 13/1673 |
| 2021/0234946 | A1 | 7/2021 | Das Sharma | |

* cited by examiner

*Primary Examiner* — Phong H Dang
(74) *Attorney, Agent, or Firm* — CHRISTENSEN O'CONNOR JOHNSON KINDNESS PLLC

(57) ABSTRACT

A port device for use in a USB extension environment that couples a host device to one or more USB devices is provided. The port device includes a USB physical layer interface configured to be coupled to a USB device, a host device, or a USB hub device; a remote interface configured to be coupled to an extension medium; and an endpoint table. The port device includes logic that, in response to execution by the port device, causes the port device to perform actions comprising: receiving a first USB message addressed to a first endpoint; in response to determining that the endpoint table indicates that the first endpoint is active, providing the first USB message for transmission to the first endpoint; and in response to determining that the endpoint table indicates that the first endpoint is inactive, providing a synthetic USB message for transmission to the host device.

20 Claims, 5 Drawing Sheets

BUFFER MANAGEMENT FOR ISO IN ENDPOINTS IN USB EXTENSION SYSTEMS

CROSS REFERENCE TO RELATED APPLICATION

This application claims the benefit of Provisional Application No. 63/167,532, filed Mar. 29, 2021, the entire disclosure of which is hereby incorporated by reference herein for all purposes.

BACKGROUND

USB is a peripheral interface for attaching a wide variety of computing devices, such as personal computers, digital telephone lines, monitors, modems, mice, printers, scanners, game controllers, keyboards, storage devices, and/or the like. The specifications defining USB (e.g., Intel et al., Universal Serial Bus Specification, Revision 2.0, April 2000; updated as Revision 3.0 in November 2008; released as Universal Serial Bus 3.1 Specification Revision 1.0 in July 2013; released as Universal Serial Bus 3.2 Specification Revision 1.0 on Sep. 22, 2017, and subsequent updates and modifications that are backward compatible therewith, including but not limited to the Universal Serial Bus 4.0 Specification—hereinafter collectively referred to as the "USB Specifications", which term can include future modifications and revisions) are non-proprietary and are managed by an open industry organization known as the USB Forum. The USB Specifications establish basic criteria that must be met in order to comply with USB standards. One of ordinary skill in the art will recognize many terms herein from the USB Specifications. Those terms are used herein in a similar manner to their use in the USB Specifications, unless otherwise stated.

Under Revision 3.2 of the USB Specifications, Super-Speed connections are provided that use a 5 Gbps (Gen 1) or 10 Gbps (Gen 2) signaling rate. Though the specification does not mandate any particular maximum cable length, in practical terms the timing mandates and signaling techniques require a regular copper cable used for a SuperSpeed connection between a host and a device to be at most 3 meters long to properly support the SuperSpeed connection. Therefore, new techniques are needed to optionally allow for extension of a SuperSpeed USB device to a greater distance from the host to which it is coupled, such that SuperSpeed USB packets may be propagated between the host and the USB device.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a port device for use in a USB extension environment that couples a host device to one or more USB devices is provided. The port device includes a USB physical layer interface, a remote interface, and an endpoint table. The USB physical layer interface is configured to be coupled to a USB device, a host device, or a USB hub device. The remote interface is configured to be coupled to an extension medium. The port device also includes logic that, in response to execution by the port device, causes the port device to perform actions including receiving a first USB message addressed to a first endpoint; in response to determining that the endpoint table indicates that the first endpoint is active, providing the first USB message for transmission to the first endpoint; and in response to determining that the endpoint table indicates that the first endpoint is inactive, providing a synthetic USB message for transmission to the host device.

In some embodiments, a method executed in a USB extension environment is provided. A port device receives a first USB message generated by a host device and addressed to a first endpoint. In response to determining that an endpoint table maintained by the port device indicates that the first endpoint is active, the port device provides the first USB message for transmission to the first endpoint. In response to determining that the endpoint table indicates that the first endpoint is inactive, the port device provides a synthetic USB message for transmission to the host device.

In some embodiments, a non-transitory computer-readable medium having computer-executable instructions stored thereon is provided. The instructions, in response to execution by one or more processors of a port device, cause the port device to perform actions including receiving, by the port device, a first USB message generated by a host device and addressed to a first endpoint; in response to determining that an endpoint table maintained by the port device indicates that the first endpoint is active, providing, by the port device, the first USB message for transmission to the first endpoint; and in response to determining that the endpoint table indicates that the first endpoint is inactive, providing, by the port device, a synthetic USB message for transmission to the host device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
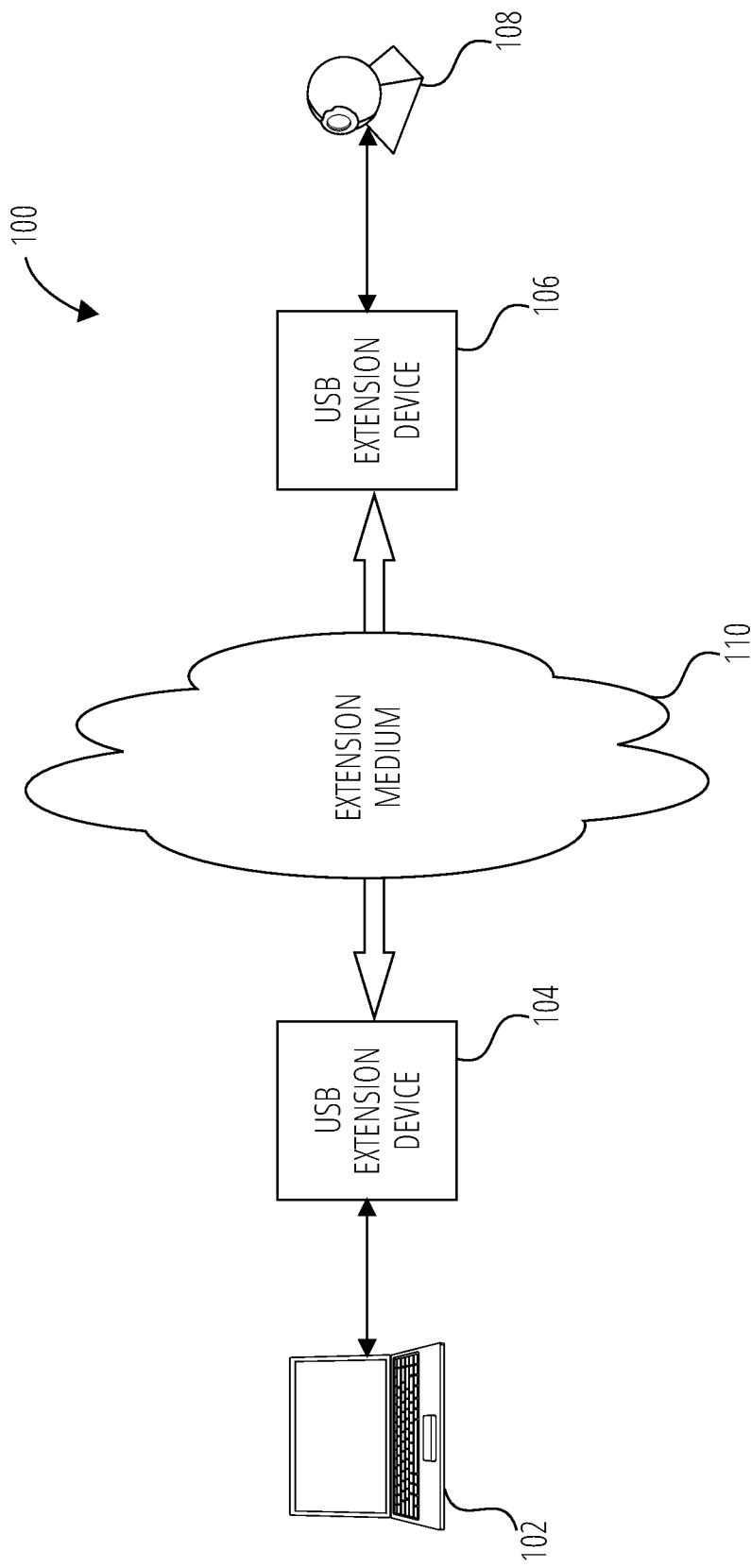
FIG. 1 is a block diagram that illustrates a non-limiting example embodiment of a system for extending USB communication according to various embodiments of the present disclosure.

FIG. 1 is a block diagram that illustrates a non-limiting example embodiment of a system 100 for extending USB communication according to various aspects of the present disclosure. The system 100 includes a host device 102 and a USB device 108. Traditionally, the host device 102 and the USB device 108 would be directly connected via a USB cable, and would communicate directly with one another via a protocol that conforms to a USB specification, such as USB. 1.0, USB. 1.1, USB. 2.0, USB. 3.0, or USB. 3.1. As discussed above, such a connection would be limited to a short distance between the host device 102 and the USB device 108 due to the timing requirements of the USB specification.

The host device 102 may be any type of computing device containing a USB host controller. Some examples of suitable host devices 102 may include, but are not limited to, a desktop computer, a laptop computer, a tablet computing device, a server computer, a set-top box, an audio head unit for an automobile, an embedded host, and/or the like. Likewise, the USB device 108 may be any type of device capable of communicating via a USB protocol with a USB host controller. The example illustrated in FIG. 1 is a webcam, but some other examples of suitable USB devices 108 may include, but are not limited to, a human interface device such as a keyboard or mouse, a mass storage device such as a flash drive or external hard drive, a USB-capable medical device, a printer, a USB hub, a wireless controller, and/or the like.

In the present system 100, the host device 102 is connected via a USB protocol to an upstream USB extension device 104 (also known as an upstream facing port device or UFP device) and the USB device 108 is connected via a USB protocol to a downstream USB extension device 106 (also known as a downstream facing port device or DFP device). The UFP device 104 and the DFP device 106 are communicatively coupled via an extension medium 110 such as a network that may increase the distance between the host device 102 and the USB device 108 beyond that supported by the USB specification. The extension medium 110 and communication thereon may include any suitable networking technology, such as Ethernet, Bluetooth, WiFi, WiMax, the Internet, fiber optic point-to-point transmission, and/or the like, and any suitable communication medium, such as via physical cables, via fiber optic cable, via wireless spectrum, and/or the like.

In some embodiments, the UFP device 104 and the DFP device 106 may happen to be closer to each other than the short USB requirement distance, and/or may be directly connected by a cable instead of via a network, but retain the capability of overcoming increased latency between the host device 102 and the USB device 108 that is introduced by the use of an extension medium 110 that does not comply with the USB specifications.

One feature provided by the UFP device 104 and DFP device 106 is that they hide the presence of the extension medium 110 from the host device 102 and the USB device 108. In other words, UFP device 104 and DFP device 106 handle communication over the extension medium 110 and compensate for any additional latency introduced thereby, but the host device 102 and the USB device 108 behave as if they were connected directly via a USB specification-compliant connection. Accordingly, the host device 102 and the USB device 108 can communicate via the UFP device 104 and DFP device 106 without any non-standard software or hardware re-configuration on the host device 102 or USB device 108.

Figure 2:
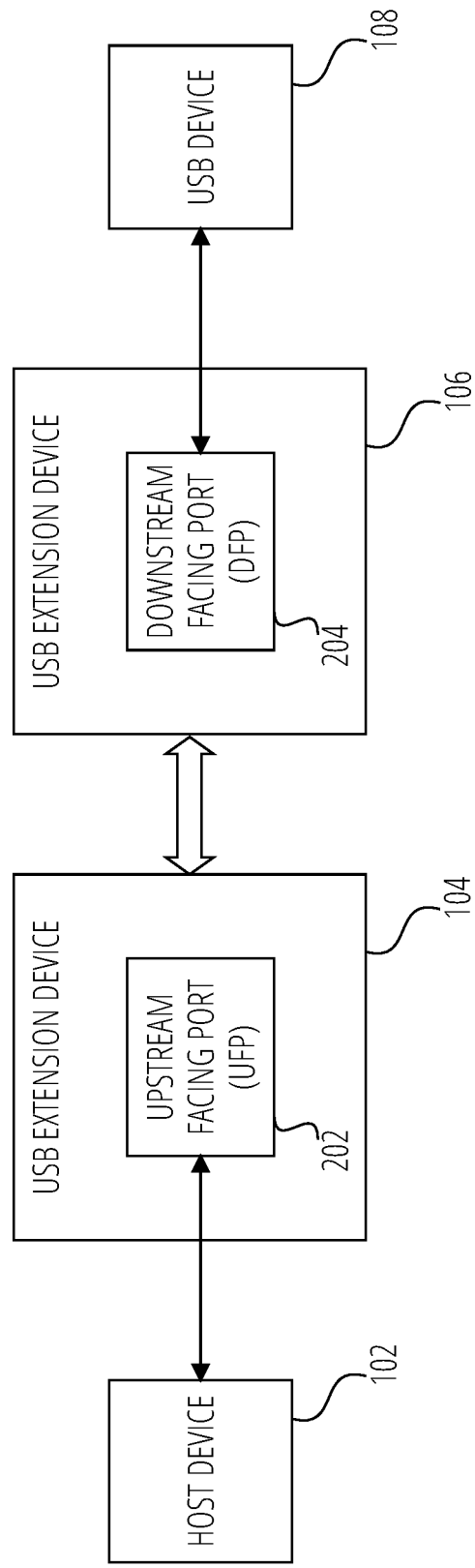
FIG. 2 is a block diagram that illustrates further details of the upstream USB extension device and downstream USB extension device illustrated in FIG. 1.

FIG. 2 is a block diagram that illustrates further details of the UFP device 104 and DFP device 106 illustrated in FIG. 1. The UFP device 104 includes an upstream facing port 202, and the DFP device 106 includes a downstream facing port 204. As used herein, the terms "upstream facing port" and the corresponding acronym "UFP" may be used interchangeably, as may the terms "downstream facing port" and the corresponding acronym "DFP." Likewise, because the upstream USB extension device 104 includes an upstream facing port 202, the upstream USB extension device 104 may also be called a "UFP device," and because the downstream USB extension device 106 includes a downstream facing port 204, the downstream USB extension device 106 may also be called a "DFP device."

The UFP device 104 is configured at least to communicate with the host device 102 via a USB-standard-compliant protocol using the upstream facing port 202, and to exchange messages and USB bus traffic with the DFP device 106 via the extension medium 110. The DFP device 106 is configured at least to communicate with the USB device 108 via a USB-standard-compliant protocol using the downstream facing port 204, and to exchange messages and USB bus traffic with the UFP device 104 via the extension medium 110. The UFP device 104 and the DFP device 106 may contain further components such as a power supply, a status LED, a loudspeaker, an input device for switching between UFP functionality and DFP functionality, and/or the like. Since such components and their functions are familiar to those of ordinary skill in the art, they have not been discussed further herein.

As illustrated in FIG. 2, the upstream facing port 202 of the UFP device 104 is connected to a downstream facing port of the host device 102, and the downstream facing port 204 of the DFP device 106 is connected to an upstream facing port of a USB device 108. In other embodiments, the upstream facing port 202 of the UFP device 104 may be connected to a downstream facing port other than one provided by a host device 102, such as a downstream facing port of a hub, and/or the like. Likewise, in other embodiments, the downstream facing port 204 of the DFP device 106 may be connected to an upstream facing port other than one provided by a USB device 108, such as an upstream facing port of a hub, and/or the like. The discussion below is primarily in terms of the simple topology illustrated in FIG. 2, but one of ordinary skill in the art will recognize that in some embodiments similar techniques may be used in other topologies without departing from the scope of the present disclosure.

Figure 3:
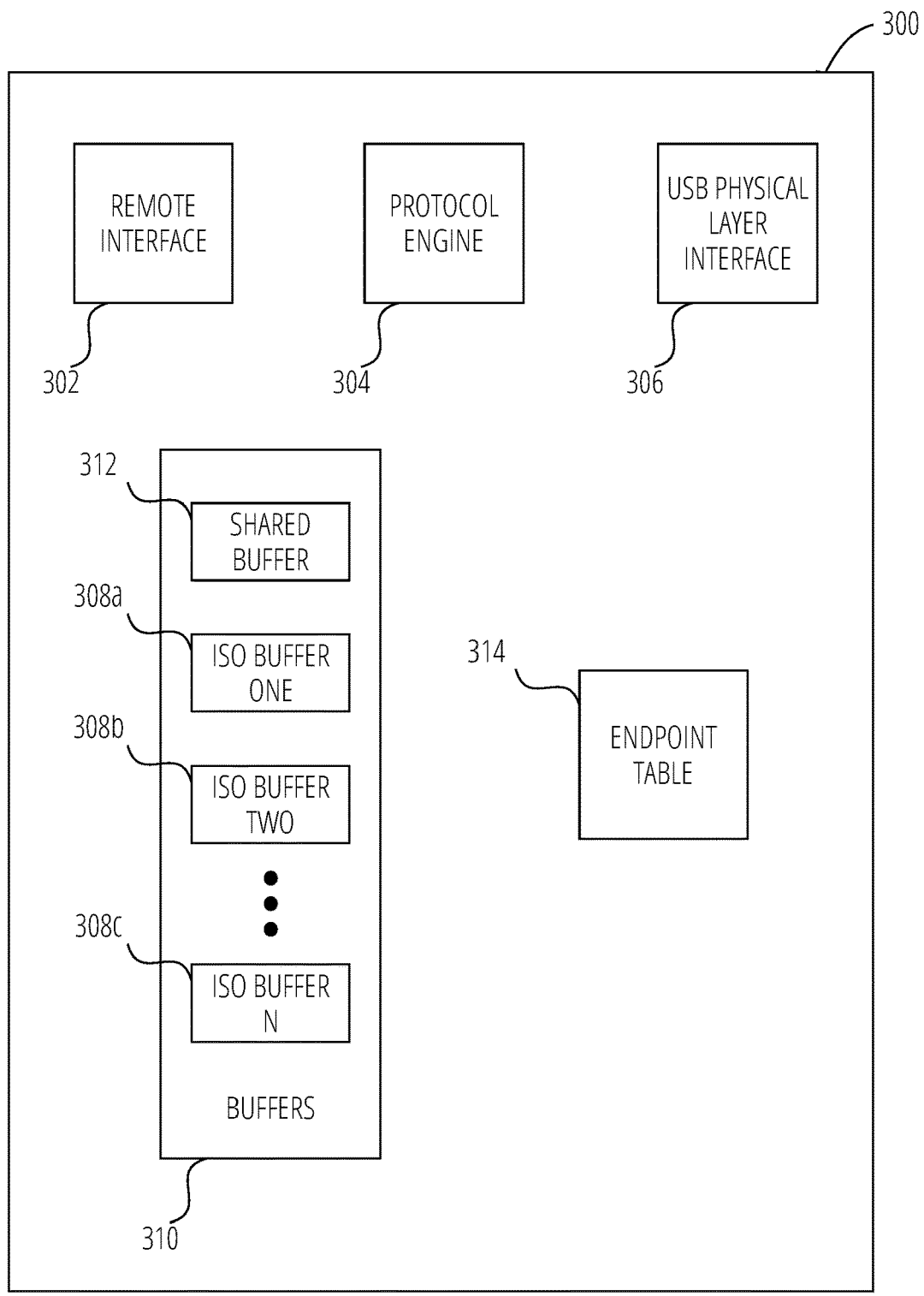
FIG. 3 is a block diagram that illustrates an exemplary embodiment of a port device according to various aspects of the present disclosure.

FIG. 3 is a block diagram that illustrates an exemplary embodiment of a port device 300 according to various aspects of the present disclosure. In some embodiments, the port device 300 may be constructed to provide services of an upstream facing port 202, and in some embodiments the port device 300 may be constructed to provide services of a downstream facing port 204. In some embodiments, the port device 300 may include instructions to provide services of both an upstream facing port 202 and a downstream facing port 204, wherein the particular port services that are provided are determined by a user configuration such as a jumper switch, a firmware setting, and/or the like.

As illustrated, the port device 300 includes a protocol engine 304, a USB physical layer interface 306, a remote interface 302, a set of buffers 310, and an endpoint table 314. In some embodiments, the protocol engine 304 may be configured to provide and/or execute the logic discussed below, along with additional logic for providing extension of USB communication over the extension medium 110. The protocol engine 304 may instruct the USB physical layer interface 306 to apply the appropriate electrical signals to the USB physical layer in order to communicate with the USB device 108 or the host device 102. Likewise, the protocol engine 304 may instruct the remote interface 302 to exchange information with the remote USB extension device.

In some embodiments, the set of buffers 310 is used to support communication with the endpoints provided by one or more USB devices 108. Typically, communication between the UFP device 104 and the DFP device 106 via the extension medium 110 experiences greater than an amount of latency permitted by the USB Specifications. In order to support seamless USB communication between the host device 102 and the USB devices 108, the port device 300 uses the set of buffers 310 in various ways to cache data, and thereby overcome complications introduced by the increased latency over the extension medium 110. Some non-limiting examples of how buffers can be used by a port device 300 to overcome complications introduced by latency over an extension medium are described in U.S. Pat. No. 10,552,355, the entire disclosure of which is hereby incorporated by reference herein for all purposes.

It has been found that, to best support isochronous endpoints, each isochronous endpoint should be assigned to its own buffer, while other types of endpoints can share a common buffer. Accordingly, the set of buffers 310 includes a shared buffer 312 and a set of isochronous communication buffers (ISO buffers), including ISO buffer one 308a, ISO buffer two 308b, and ISO buffer N 308c. The illustrated set of three isochronous communication buffers is an example only and should not be seen as limiting. In other embodiments, the set of isochronous communication buffers may include more or fewer than three isochronous communication buffers.

In some embodiments, the endpoint table 314 is used by the protocol engine 304 to track the configuration of endpoints provided by one or more USB devices 108 and managed by the host device 102. In some embodiments, the endpoint table 314 includes entries for each endpoint configured by the host device 102. Each entry in the endpoint table 314 includes USB-standard information, including but not limited to a type of transfers supported by the endpoint (e.g., control, interrupt, bulk, or isochronous), a direction of transfers supported by the endpoint (e.g., in or out), and an address of the endpoint. By tracking the configuration of endpoints in the endpoint table 314, the protocol engine 304 can efficiently provide different types of processing for different types of messages generated by the host device 102.

Each entry in the endpoint table 314 also includes an indication of a buffer of the set of buffers 310, if any, to be used for communication with the endpoint, and an indication of whether the endpoint is active or inactive within the extension environment. This indication is separate from whether the endpoint is active or inactive on the USB device 108, and instead indicates how the port device 300 will handle attempts to communicate with the endpoint as described further below.

In some embodiments, the protocol engine 304 and/or the buffers 310 and/or the endpoint table 314 may be implemented within a logic device such as a PLD, an ASIC, a FPGA, and/or the like. In other embodiments, the protocol engine 304 may be implemented within a computing device having at least one processor and a memory containing computer-executable instructions that, if executed by the at least one processor, cause the protocol engine 304 to perform the actions discussed below; a dedicated digital hardware device implemented, for example, as a state machine configured to perform the actions described; within an application specific processor; and/or within any other suitable computing device. In some embodiments, the protocol engine 304 (or other component of the port device 300) may include a computer-readable memory usable to cache data packets, as discussed further below.

In some embodiments, logic of actions attributed to a USB extension device is executed by a protocol engine 304, which then instructs a USB physical layer interface 306 and/or a remote interface 302 to perform the appropriate communication steps associated with the logic. Throughout the discussion below, such actions may simply be described as being performed by the UFP device 104 or the DFP device 106 as if it was a single device for ease of discussion. One of ordinary skill in the art will recognize that actions attributed directly to the UFP device 104 or the DFP device 106 may actually be performed by a protocol engine 304, a USB physical layer interface 306, a remote interface 302, and/or some other component of the USB extension device.

Upon connection of a given USB device 108, the host device 102 enumerates all of the endpoints provided by the given USB device 108, including any isochronous communication endpoints, in order to populate an endpoint table maintained by the host device 102. The UFP device 104 and the DFP device 106 monitor CONTROL messages between the host device 102 and the USB devices 108 that are used during this endpoint enumeration so that the endpoint table 314 can be kept in sync with the endpoint table maintained by the host device 102.

Because a limited number of ISO buffers are provided by the port device 300, the UFP device 104 and DFP device 106 may support a smaller number of concurrent isochronous communication endpoints (one isochronous communication endpoint supported for each isochronous communication buffer) compared to the number supported by the host device 102 outside of the extension environment. Accordingly, in some deployments, a user may connect USB devices 108 that provide more isochronous communication endpoints than can be supported by the number of isochronous communication buffers in the set of buffers 310. This creates a technical problem in that the UFP device 104 and DFP device 106 allow the host device 102 to enumerate and add more isochronous communication endpoints to the endpoint table of the host device 102 than are supported by the UFP device 104 and DFP device 106.

While some trivial solutions are possible to avoid this problem, such as blocking the host device 102 from enumerating an unsupported number of isochronous communication endpoints, these trivial solutions are suboptimal for multiple reasons. For instance, the host device 102 only enumerates endpoints on a given USB device 108 when the given USB device 108 is first connected. Accordingly, if an isochronous communication buffer is not available when the given USB device 108 is first connected but becomes available later, the host device 102 will not be notified that it should re-enumerate the endpoints of the given USB device 108, and the given USB device 108 will not be functional. Likewise, users of the host device 102 may be confused if only non-isochronous endpoints on the given USB device 108 are enumerated. What is desired are techniques that allow all isochronous communication endpoints to be enumerated, even if isochronous communication buffers are not available for servicing all of the isochronous communication endpoints.

Figure 4A:
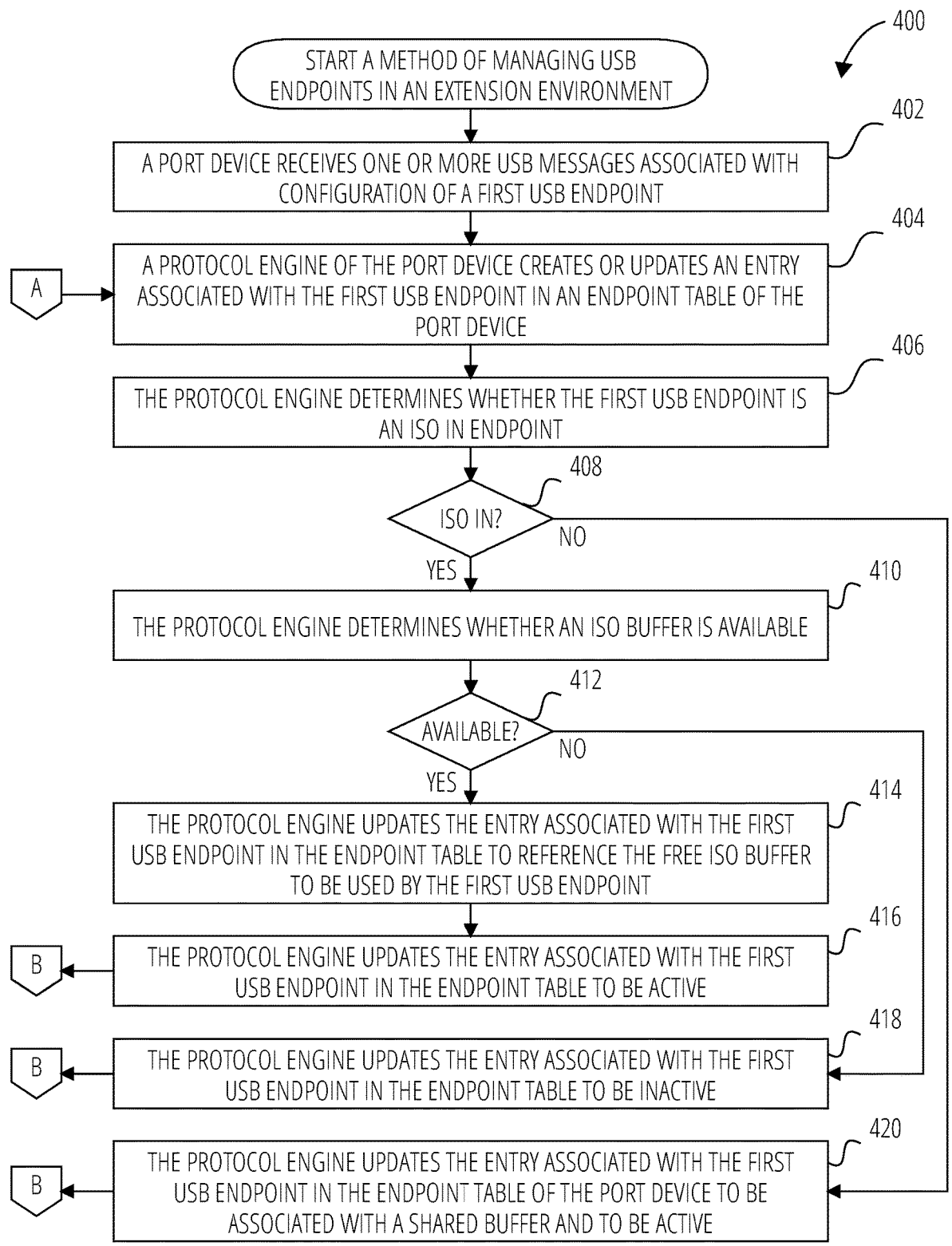
FIG. 4A-FIG. 4B are a flowchart that illustrates a non-limiting example embodiment of a method of managing USB endpoints in an extension environment according to various aspects of the present disclosure.
Figure 4B:
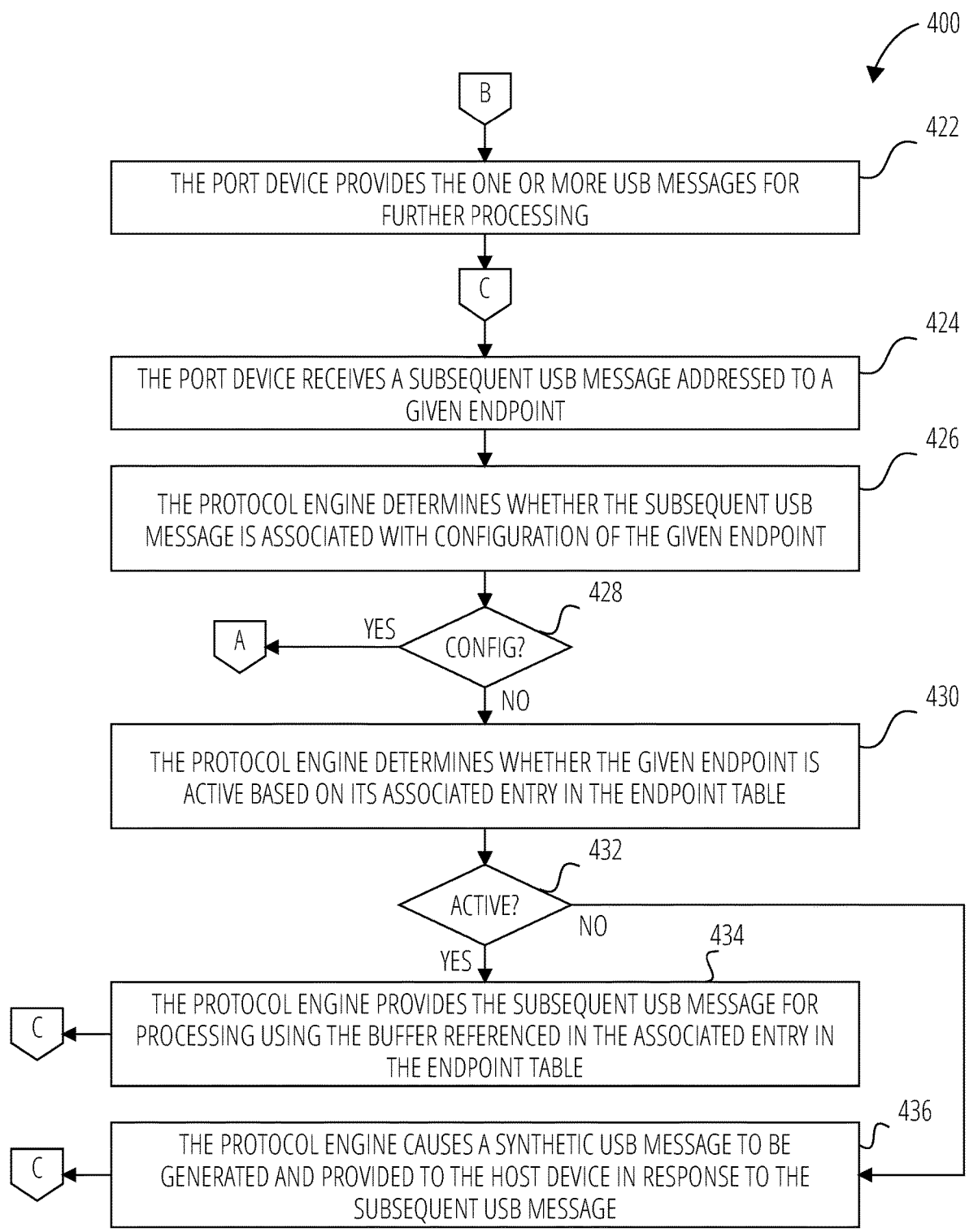

FIG. 4A-FIG. 4B are a flowchart that illustrates a non-limiting example embodiment of a method of managing USB endpoints in an extension environment according to various aspects of the present disclosure. In the method 400, the UFP device 104 and the DFP device 106 allow the host device 102 to enumerate all of the endpoints provided by the USB devices 108, but for isochronous communication endpoints that are not assigned to an isochronous communication buffer, the UFP device 104 and the DFP device 106 provide synthetic USB messages to the host device 102 in response to requests for data. This causes those endpoints to appear to the host device 102 to be inactive or otherwise not have any data to transmit. This is preferable to merely hiding the endpoints because they will be visible to the host device 102, and because in some embodiments these endpoints may be later assigned to an isochronous communication buffer that becomes available in the future, thus allowing the host device 102 to communicate normally with the endpoints.

In FIG. 4A and FIG. 4B, the actions are primarily described as being performed by a port device 300. Typically, the port device 300 will be the port device 300 of a UFP device 104, since the UFP device 104 is coupled via a connection compliant with the USB Specifications to the host device 102, and is the first device in the extension environment to receive the endpoint enumeration messages from the host device 102. In such embodiments, USB messages will be received by the port device 300 from the USB physical layer interface 306. However, in some embodiments, the port device 300 may be the port device 300 of a DFP device 106. In those embodiments, USB messages will be received by the port device 300 from the remote interface 302. In some embodiments, the method 400 (or portions thereof) may be performed by both the port device 300 of the UFP device 104 and by the port device 300 of the DFP device 106.

From a start block, the method 400 proceeds to block 402, where a port device 300 receives one or more USB messages associated with configuration of a first USB endpoint. To configure the first USB endpoint, the host device 102 transmits one or more CONTROL messages addressed to the first USB endpoint. Accordingly, the port device 300 may detect the CONTROL messages associated with configuring the first USB endpoint. In embodiments wherein the port device 300 is part of the UFP device 104, the port device 300 receives the USB message via the USB physical layer interface 306. In embodiments wherein the port device 300 is part of the DFP device 106, the port device 300 receives the USB message via the remote interface 302.

In block 404, a protocol engine 304 of the port device 300 creates or updates an entry associated with the first USB endpoint in an endpoint table 314 of the port device 300. The protocol engine 304 creates or updates the entry based on information extracted from the one or more CONTROL messages addressed to the first USB endpoint. As described above, the extracted information that is used to create or update the entry may include USB-standard information, including but not limited to a type of transfers supported by the endpoint, a direction of transfers supported by the endpoint, and an address of the endpoint. If an entry is not yet associated with the first USB endpoint, then the protocol engine 304 creates the entry to hold the extracted information. If an entry is associated with the first USB endpoint, then the protocol engine 304 updates the existing entry with the extracted information.

In block 406, the protocol engine 304 determines whether the first USB endpoint is an ISO IN endpoint, an isochronous communication endpoint intended to transfer information from the first USB endpoint to the host device 102. This determination may be based on whether the extracted information from the USB messages indicate that the first USB endpoint is an ISO IN endpoint.

If the determination is that the first USB endpoint is an ISO IN endpoint, then the result of decision block 408 is YES, and the method 400 proceeds to block 410. At block 410, the protocol engine 304 determines whether an ISO buffer 308a-308c is available. The protocol engine 304 may use any suitable technique for determining whether an ISO buffer 308a-308c is available. For example, the protocol engine 304 may count a number of entries in the endpoint table 314 for ISO IN endpoints, and may compare that number of entries to the number of ISO buffers 308a-308c, and may determine that an ISO buffer 308a-308c is available if there are fewer entries than there are ISO buffers 308a-308c. As another example, the protocol engine 304 may maintain a separate counter of used ISO buffers 308a-308c, and may determine that an ISO buffer 308a-308c is available if the counter of used ISO buffers 308a-308c is smaller than the number of ISO buffers 308a-308c. As yet another example, a bit vector of a length that matches the number of ISO buffers 308a-308c may be maintained, and each position in the bit vector may serve as a one-hot flag to indicate whether the corresponding ISO buffer is in use using minimal logic.

If it is determined that an ISO buffer 308a-308c is available, then the result of decision block 412 is YES, and the method 400 proceeds to block 414. At block 414, the protocol engine 304 updates the entry associated with the first USB endpoint in the endpoint table 314 to reference the free ISO buffer to be used by the first USB endpoint. For example, if the free ISO buffer is ISO buffer one 308a, the protocol engine 304 updates the entry associated with the first USB endpoint to reference ISO buffer one 308a. At block 416, the protocol engine 304 updates the entry associated with the first USB endpoint in the endpoint table 314 to be active. This "active" status is internal to the extension environment, and is separate from whether the first USB endpoint is active according to the USB Specifications. The extension environment "active" status will be used later in method 400 as illustrated in FIG. 4B. After block 416, the method 400 advances to a continuation terminal ("terminal B").

Returning to decision block 412, if it is determined that an ISO buffer 308a-308c is not available, then the result of decision block 412 is NO, and the method 400 proceeds to block 418. At block 418, the protocol engine 304 updates the entry associated with the first USB endpoint in the endpoint table 314 to be inactive. Again, the "inactive" status is internal to the extension environment, and is separate from whether the first USB endpoint is active according to the USB Specifications. As with the "active" status, the "inactive" status within the extension environment will be used later in method 400 as illustrated in FIG. 4B. After block 418, the method 400 advances to a continuation terminal ("terminal B").

Returning to decision block 408, if it is determined that the first USB endpoint is not an ISO IN endpoint, then the result of decision block 408 is NO, and the method 400 proceeds to block 420. At block 420, the protocol engine 304 updates the entry associated with the first USB endpoint in the endpoint table 314 of the port device 300 to be associated with a shared buffer 312 and to be active. As with the actions in block 416 and block 418, the "active" status established in block 420 is internal to the extension environment, and is separate from whether the first USB endpoint is active according to the USB Specifications. In some embodiments, the protocol engine 304 does not update the entry associated with the first endpoint to be associated with the shared buffer 312, but instead the protocol engine 304 assumes that any endpoint in the endpoint table 314 that is not an ISO IN endpoint uses the shared buffer 312. After block 420, the method 400 advances to a continuation terminal ("terminal B").

From terminal B (FIG. 4B), the method 400 proceeds to block 422. At block 422, the port device 300 provides the one or more USB messages for further processing. In embodiments wherein the port device 300 is part of the UFP device 104, the further processing may include preparing and transmitting the one or more USB messages for transmission to the DFP device 106 by the remote interface 302 via the extension medium 110. In embodiments wherein the port device 300 is part of the DFP device 106, the further processing may include preparing and transmitting the one or more USB messages for transmission to the first USB endpoint by the USB physical layer interface 306 using techniques that comply with the USB Specifications.

From block 422, the method 400 proceeds through a continuation terminal ("terminal C"), and then to block 424. At block 424, the port device 300 receives a subsequent USB message addressed to a given endpoint. The given endpoint may be the same endpoint as the first USB endpoint, or may be a different USB endpoint for which an entry is established in the endpoint table 314. The terms "first," "subsequent," and "given" are used for purposes of disambiguation within the flowchart and the description thereof, and should not be seen as limiting to any particular type of USB message or USB endpoint.

In block 426, the protocol engine 304 determines whether the subsequent USB message is associated with configuration of the given endpoint, as was the first USB message, as opposed to being related to a data transfer. If the subsequent USB message is associated with configuration of the given endpoint, then the result of decision block 428 is YES, and the method 400 returns to terminal A and block 404, where the subsequent USB message will be treated as described for the one or more USB messages of block 402.

Otherwise, if it is determined that the subsequent USB message is not associated with configuration of the given endpoint, then the result of decision block 428 is NO, and the method 400 proceeds to block 430. At block 430, the protocol engine 304 determines whether the given endpoint is active based on its associated entry in the endpoint table 314. That is, the protocol engine 304 checks the entry in the endpoint table 314 for the given endpoint to determined if the status internal to the extension environment is recorded as "active" (the endpoint has been assigned to a buffer of the set of buffers 310) or the status internal to the extension environment is recorded as "inactive" (the endpoint has not been assigned to a buffer of the set of buffers 310).

If it is determined that the given endpoint is active within the extension environment, then the result of decision block 432 is YES, and the method 400 advances to block 434. At block 434, the protocol engine 304 provides the subsequent USB message for processing using the buffer referenced in the associated entry in the endpoint table 314. For example, if the port device 300 is part of a UFP device 104, the protocol engine 304 may provide the subsequent USB message for processing that will prepare and transmit the subsequent USB message to the DFP device 106 via the remote interface 302 and the extension medium 110. As another example, if the port device 300 is part of a DFP device 106, the protocol engine 304 may provide the subsequent USB message for processing that will prepare and transmit the subsequent USB message to the given endpoint via the USB physical layer interface 306. The method 400 then proceeds to terminal C to process the next USB message.

Returning to decision block 432, if it was determined that the given endpoint is inactive within the extension environment, then the result of decision block 432 is NO, and the method 400 advances to block 436. At block 436, the protocol engine 304 causes a synthetic USB message to be generated and provided to the host device in response to the subsequent USB message. The term "synthetic" refers to the fact that the synthetic USB message is generated entirely by the protocol engine 304, as opposed to representing a USB message that was generated by the given endpoint. In some embodiments, the synthetic USB message is a packet having zero-length data, or a null packet. The protocol engine 304 transmits the synthetic USB message in response to the subsequent USB message, either via the USB physical layer interface 306 (in embodiments wherein the port device 300 is in the UFP device 104) or via the remote interface 302 (in embodiments wherein the port device 300 is in the DFP device 106).

Upon receiving the synthetic USB message, the host device 102 will process the synthetic USB message as a legitimate response to the subsequent USB message, and will treat it as if the given endpoint did not transmit any data. While the given endpoint will not be functional, the endpoint table on the host device 102 and the endpoint tables 314 on the UFP device 104 and DFP device 106 will remain in sync, and other active endpoints on the USB device 108 that hosts the given endpoint will operate as expected. Accordingly, the entire system 100 will remain more stable than if enumeration of the inactive endpoint was blocked altogether, and an improved experience will be obtained.

After block 436, the method 400 proceeds to terminal C to process the next USB message. The method 400 operates indefinitely while the system 100 remains active, and may stop when one or more of the components of the system 100 are powered down, deactivated, or communicatively decoupled from the system 100.

While illustrative embodiments have been illustrated and described, it will be appreciated that various changes can be made therein without departing from the spirit and scope of the invention. For example, though not illustrated or described above, in some embodiments the protocol engine 304 may continue to monitor configuration of the endpoints and detect when an isochronous communication endpoint that had previously been assigned to an ISO buffer 308a-308c is deactivated, either from a disconnection of the hosting USB device 108, or from a configuration applied by the host device 102. Upon detecting this deactivation, the protocol engine 304 may re-assign an isochronous communication endpoint that was previously recorded in the endpoint table 314 as inactive to the newly freed ISO buffer 308a-308c, and may change the status of the isochronous communication endpoint in the endpoint table 314 from inactive to active.

As another example, the description above states that the protocol engine 304 explicitly records an active or inactive status of each endpoint in the endpoint table 314. In some embodiments, the protocol engine 304 does not record a separate piece of data to indicate the active or inactive status. Instead, the protocol engine 304 may record a buffer of the set of buffers 310 to which each endpoint is assigned, and if no ISO buffer 308a-308c is available, the protocol engine 304 may leave a null value in the record for the assigned buffer. In this way, the active or inactive status may be implicitly determined based on whether a buffer has been assigned to the endpoint, and a small amount of storage space may be saved.

The embodiments of the invention in which an exclusive property or privilege is claimed are defined as follows:

1. A port device for use in a USB extension environment that couples a host device to one or more USB devices, the port device comprising:
   a USB physical layer interface configured to be coupled to a USB device, a host device, or a USB hub device;

a remote interface configured to be coupled to an extension medium;
an endpoint table; and
logic that, in response to execution by the port device, causes the port device to perform actions comprising:
receiving a configuration USB message associated with configuration of a communication endpoint;
creating an entry associated with the communication endpoint in the endpoint table;
receiving a first USB message addressed to a first endpoint;
in response to determining that the endpoint table indicates that the first endpoint is active, providing the first USB message for transmission to the first endpoint; and
in response to determining that the endpoint table indicates that the first endpoint is inactive, providing a synthetic USB message for transmission to the host device.

2. The port device of claim 1, wherein the communication endpoint is an isochronous communication endpoint; and
wherein the configuration USB message is a second USB message associated with configuration of the isochronous communication endpoint.

3. The port device of claim 2, further comprising one or more isochronous communication buffers.

4. The port device of claim 3, wherein the actions further comprise:
determining whether an isochronous communication buffer is available to be assigned to the isochronous communication endpoint;
in response to determining that an isochronous communication buffer is available, updating the entry in the endpoint table associated with the isochronous communication endpoint to reference the isochronous communication buffer and to indicate that the isochronous communication endpoint is active; and
in response to determining that an isochronous communication buffer is not available, updating the entry in the endpoint table associated with the isochronous communication endpoint to indicate that the isochronous communication endpoint is inactive.

5. The port device of claim 1, further comprising a shared buffer;
wherein the configuration USB message associated with configuration of the communication endpoint is a third USB message associated with configuration of a second endpoint, wherein the second endpoint is of a type other than an isochronous communication endpoint; and
wherein the actions further comprise creating an entry associated with the second endpoint that references the shared buffer and indicates that the second endpoint is active in the endpoint table.

6. The port device of claim 1, wherein providing the synthetic USB message for transmission to the host device includes providing a packet having zero-length data for transmission to the host device.

7. The port device of claim 1, wherein the remote interface includes one or more of a fiber optic interface, an Ethernet interface, and a wireless interface.

8. The port device of claim 1, wherein the port device is part of an upstream USB extension device or a downstream USB extension device.

9. A method executed in a USB extension environment, the method comprising:
receiving, by a port device, a configuration USB message associated with configuration of a communication endpoint;
creating an entry associated with the communication endpoint in an endpoint table maintained by the port device;
receiving, by the port device, a first USB message generated by a host device and addressed to a first endpoint;
in response to determining that the endpoint table indicates that the first endpoint is active, providing, by the port device, the first USB message for transmission to the first endpoint; and
in response to determining that the endpoint table indicates that the first endpoint is inactive, providing, by the port device, a synthetic USB message for transmission to the host device.

10. The method of claim 9, wherein the communication endpoint is an isochronous communication endpoint; and
wherein the configuration USB message is a second USB message associated with configuration of the isochronous communication endpoint.

11. The method of claim 10, further comprising:
determining, by the port device, whether an isochronous communication buffer of the port device is available to be assigned to the isochronous communication endpoint;
in response to determining that an isochronous communication buffer is available, updating, by the port device, the entry in the endpoint table associated with the isochronous communication endpoint to reference the isochronous communication buffer and to indicate that the isochronous communication endpoint is active; and
in response to determining that an isochronous communication buffer is not available, updating, by the port device, the entry in the endpoint table associated with the isochronous communication endpoint to indicate that the isochronous communication endpoint is inactive.

12. The method of claim 9,
wherein the configuration USB message associated with configuration of the communication endpoint is a third USB message associated with configuration of a second endpoint, wherein the second endpoint is of a type other than an isochronous communication endpoint; and
wherein the method further comprises creating, by the port device, an entry associated with the second endpoint that references a shared buffer of the port device and indicates that the second endpoint is active in the endpoint table.

13. The method of claim 9, wherein providing the synthetic USB message for transmission to the host device includes providing a packet having zero-length data for transmission to the host device.

14. The method of claim 9, wherein receiving the first USB message includes receiving, by the port device, the first USB message via a remote interface; and
wherein providing, by the port device, the synthetic USB message for transmission to the host device includes providing, by the port device, the synthetic USB message to the remote interface.

15. The method of claim 9, wherein receiving the first USB message includes receiving, by the port device, the first USB message via a USB physical layer interface; and
wherein providing, by the port device, the synthetic USB message for transmission to the host device includes providing, by the port device, the synthetic USB message to the USB physical layer interface.

16. A non-transitory computer-readable medium having computer-executable instructions stored thereon that, in response to execution by one or more processors of a port device, cause the port device to perform actions comprising:

receiving, by the port device, a configuration USB message associated with configuration of a communication endpoint;

creating, by the port device, an entry associated with the communication endpoint in the endpoint table;

receiving, by the port device, a first USB message generated by a host device and addressed to a first endpoint;

in response to determining that an endpoint table maintained by the port device indicates that the first endpoint is active, providing, by the port device, the first USB message for transmission to the first endpoint; and in response to determining that the endpoint table indicates that the first endpoint is inactive, providing, by the port device, a synthetic USB message for transmission to the host device.

17. The computer-readable medium of claim 16, wherein the communication endpoint is an isochronous communication endpoint; and wherein the configuration USB message is a second USB message associated with configuration of the isochronous communication endpoint.

18. The computer-readable medium of claim 17, wherein the actions further comprise:

determining, by the port device, whether an isochronous communication buffer of the port device is available to be assigned to the isochronous communication endpoint;

in response to determining that an isochronous communication buffer is available, updating, by the port device, the entry in the endpoint table associated with the isochronous communication endpoint to reference the isochronous communication buffer and to indicate that the isochronous communication endpoint is active; and in response to determining that an isochronous communication buffer is not available, updating, by the port device, the entry in the endpoint table associated with the isochronous communication endpoint to indicate that the isochronous communication endpoint is inactive.

19. The computer-readable medium of claim 16, wherein the configuration USB message associated with configuration of the communication endpoint is a third USB message associated with configuration of a second endpoint, wherein the second endpoint is of a type other than an isochronous communication endpoint; and wherein the actions further comprise creating, by the port device, an entry associated with the second endpoint that references a shared buffer of the port device and indicates that the second endpoint is active in the endpoint table.

20. The computer-readable medium of claim 16, wherein providing the synthetic USB message for transmission to the host device includes providing a packet having zero-length data for transmission to the host device.

* * * * *